(12) United States Patent
DeMers

(10) Patent No.: US 9,545,096 B2
(45) Date of Patent: Jan. 17, 2017

(54) FOOT SNARE TRIGGERING DEVICE

(71) Applicant: Michael Steven DeMers, Great Falls, MT (US)

(72) Inventor: Michael Steven DeMers, Great Falls, MT (US)

(73) Assignee: Universal Select-A-Catch, LLC, Valier, MT (US)

( * ) Notice: Subject to any disclaimer, the term of this patent is extended or adjusted under 35 U.S.C. 154(b) by 233 days.

(21) Appl. No.: 13/999,475

(22) Filed: Mar. 4, 2014

(65) Prior Publication Data
US 2014/0202065 A1 Jul. 24, 2014

Related U.S. Application Data

(63) Continuation-in-part of application No. 13/083,283, filed on Apr. 8, 2011, now Pat. No. 8,701,334.

(51) Int. Cl.
*A01M 23/34* (2006.01)
*A01M 23/24* (2006.01)

(52) U.S. Cl.
CPC ................... *A01M 23/34* (2013.01)

(58) Field of Classification Search
CPC .... A01M 23/34; A01M 23/00; A01M 23/245; A01M 99/00; A01M 1/12; A01M 1/24; A01M 23/14; A01M 31/00
USPC .................... 43/58, 81, 85, 86, 87
See application file for complete search history.

(56) References Cited

U.S. PATENT DOCUMENTS

| | | | |
|---|---|---|---|
| 2,168,132 A | 8/1939 | Marshall | 43/87 |
| 2,592,390 A | 4/1952 | Burt | |
| 3,060,623 A | 10/1962 | Aldrich | |
| 4,179,837 A | 12/1979 | Gummeringer | |
| 4,208,827 A | 6/1980 | Starkey | |
| 4,250,653 A | 2/1981 | Davies | 43/87 |
| 4,286,404 A | 9/1981 | Novak et al. | |
| 4,329,605 A | 5/1982 | Angi et al. | |
| 4,513,527 A | 4/1985 | Wicklund | |
| 4,581,844 A | 4/1986 | Torkko | |
| 4,660,319 A | 4/1987 | Ellwood | 43/96 |

(Continued)

FOREIGN PATENT DOCUMENTS

| | | |
|---|---|---|
| FR | 2770970 A1 | 5/1999 |
| JP | 05064536 A | 3/1993 |
| JP | 2006006234 A | 1/2006 |

*Primary Examiner* — David Parsley
*Assistant Examiner* — George Andonyan
(74) *Attorney, Agent, or Firm* — Jean Kyle

(57) ABSTRACT

The foot snare triggering device of the present invention is designed to be used with a foot snare, and comprises a trigger plate assembly, having a tension adjustment means which allows the trigger plate assembly to pivotally yield to vertical pressure. A trigger mechanism has a trigger end set within said plate assembly and is attached to an extension mechanism providing a tandem extension spring configuration attached to a pair of pulleys, and a snare attachment port located within the trigger mechanism for releasably securing a foot snare by moving longitudinally when the trigger mechanism is engaged by pressure to said plate assembly allowing a foot snare to be released from the snare attachment port after triggering said device. A pan, pivotally connected to the plate underside distal to the pan tension adjustment means, has a trigger mount to engagingly receive the trigger mechanism.

5 Claims, 2 Drawing Sheets

(56) References Cited

U.S. PATENT DOCUMENTS

| | | |
|---|---|---|
| 4,739,578 A | 4/1988 | Pitchford, Jr. |
| 4,751,790 A | 6/1988 | Thomas |
| 4,827,662 A | 5/1989 | Dahlman |
| 5,062,237 A * | 11/1991 | Kitagawa ............... A01M 23/34 43/86 |
| 5,691,510 A | 11/1997 | Turman ........................ 177/225 |
| 6,016,624 A | 1/2000 | Rose |
| 6,032,405 A | 3/2000 | Rose |

* cited by examiner

FOOT SNARE TRIGGERING DEVICE

CROSS-REFERENCE TO RELATED APPLICATION

This is a continuation-in-part of application Ser. No. 13/083,283, filed Apr. 8, 2011, now pending, which application claims priority from the provisional patent application filed Apr. 28, 2010, Application No. 61/328,982. Each patent application identified above is incorporated here by reference in its entirety to provide continuity of disclosure.

FIELD OF THE INVENTION

The present invention relates to an improved foot snare triggering device, in particular to one which is used for setting foot snare animal traps, modifying and improving the conventional animal snare trigger devices known in the industry.

BACKGROUND OF THE INVENTION

The capturing of animals for pelts and attendant animal damage control is a long-practiced art. Through the years attempts have been made to make animal foot snare traps, commonly operating via a triggering device, in a more selective and humane manner to the trapped animal prey. Several states and countries have now outlawed steel leg hold traps, and pressure continues to grow for more states to do the same. The present invention is an improved triggering device to be used with snares and other trapping means, which has a wide variety of trapping uses on animals of differing sizes. The present invention is a humane selective foot snare triggering device which will be a valuable tool in capturing a wide variety of animals, and is easy to set as an extension mechanism powered, weight tensioned device, which is smaller, more portable and has a more efficient snare delivery capability.

Animal traps in the related art commonly consist of a foot snare or other trap device to catch a game animal, activated by a spring mechanism requiring a trigger mechanism to set and then release the trap. Foot snare traps in the related art, include: U.S. Pat. No. 3,060,623 to Aldrich ("'623 patent"); U.S. Pat. Nos. 4,286,404 and 4,329,805 to Novak ("'404 patent" and "'805 patent"); U.S. Pat. No. 4,581,843 to Fremont, et al ("'843 patent"); U.S. Pat. No. 2,592,390 to Burt ("'390 patent"); U.S. Pat. No. 4,581,844 to Torkko ("'844 patent"); U.S. Pat. No. 4,751,790 to Thomas ("'790 patent"); and U.S. Pat. No. 6,032,405 to Rose ("'405 patent"), Patent No. 2006 006 234 of Japan to Toumine. All such referenced devices require a tensional or compressional spring mechanism to activate the snare, or utilize a spring throw arm as a lifting means for providing an oblique movement of the foot snare loop to catch the game animal, necessary when the trap is sprung or triggered to enable the snare to catch the ankle of the game animal and not result in a "toe catch" (catching only the animal's foot or toes), a common occurrence with many snare traps in existence. None of the related prior art provides the extensional mechanism of the present invention which operates in an efficient manner to activate a foot snare trap in a longitudinal or horizontal direction providing a snare delivery mechanism to provide the necessary upward and oblique movement for the snare. This oblique movement is provided by one embodiment of the present invention by a snare delivery system, comprising vertical springs pivotally connected to a trigger plate assembly. Neither the aforementioned patents nor those citations that follow provide the extensional mechanism of the present invention and would not teach the inclusion of or use of such an element, as they rely on the spring throw arm of a spring mechanism, or exclude any upward, oblique movement provision.

Some related art triggering a foot snare do utilize a longitudinal or horizontal compressional or tension spring mechanism, such as a tensional spring, including: U.S. Pat. No. 2,168,132 to Marshall ("'132 patent"), U.S. Pat. No. 4,208,827 to Starky ("'827 patent"), U.S. Pat. No. 4,250,653 to Davies ("'653 patent"), U.S. Pat. No. 4,827,662 to Dahlman ("'662 patent"), and U.S. Pat. No. 4,739,578 to Pitchford, Jr. ("'578 patent"). However, none of these related art patents have a trigger mechanism located within said spring mechanism housing, attached directly to the extension mechanism as is provided in one embodiment of the present invention. All of said patents have triggers located on the outside of the spring mechanism housing, and could not provide for or teach a trigger location within the housing since they provide for snares attached directly to the spring mechanisms, rendering these devices inoperative to achieve the results of the present invention. As well, the '662 patent is a mole trap operating in a vertical manner.

The snare traps found in the '527 patent, the '827 patent, the '837 patent, the '623 patent, the '653 patent, the '662 patent, the '578 patent, and the '132 patent all attach directly to the spring mechanism, the snare being directly driven by a spring operating in a different manner than the present invention. None of the related art patents or devices mentioned immediately above provide for the release of the snare trap to the trigger or spring mechanism after the trap is activated, as provided in the embodiment of the present invention. The present invention allows for use of a detachable snare attached by the operator. By having a snare attachment port located on the outside of the extension mechanism housing, the present invention provides for releasing the attached snare once the snare is triggered. All of the cited, related, prior art patents function to capture and retain the animal trapped in connection with the trigger and spring mechanism, while the present invention operates to release the snare holding the animal once the trigger mechanism activates the snare to trap the animal. As well, patent to Toumine, patents '622, U.S. Pat. No. 4,179,837 to Gummeringer ("'837 patent"), and U.S. Pat. No. 4,513,527 to Wicklund ("'527 patent") utilize this retention function to dispose of the trapped animal. None of these cited patents provide for a pan tension adjustment means of the present invention. Therefore, none of these animal trapping and retention patents and devices teach or operate with the structure and function of the present invention.

While U.S. Pat. No. 6,016,624 to Rose ("'624 patent") discloses a trigger mechanism for an animal trap, it is solely a tension regulating device without a means to activate a trap to catch animals comprising a movable plate adjustable to the weight of an animal, and the device of this related art may not be used in combination with other devices or elements of an embodiment of the present invention necessary to operate in the same manner or function as the present invention. The '624 patent (as well as all the other patents cited herein) operates in a completely different manner than the present invention, the '624 patent utilizing cams rather than an extension mechanism such as a return spring in one embodiment of the present invention. The '624 patent is not adapted to receive the trigger Mechanism of the present invention, and is therefore inoperable to set such trigger mechanism and teaches away from the present invention.

While some of the prior art discloses or teaches a pan tension adjustment means and trigger mechanism, such as Toumine, the present invention is distinguished by a particular configuration providing a plurality of pan tension adjustment stabilizers affixed to the pan, and a trigger rod having a trigger catch to engage a mount slot within the trigger pan assembly and a unique tandem extension spring mechanism, which provides a unique combination to adjust and set limb-triggered animal traps.

While the '527 patent and '837 patent do locate trigger mechanisms within the extension mechanism housing, neither would teach an embodiment of the present invention. The '837 patent requires catching the animal initially before applying the snare trigger mechanism, and the '527 patent, as well as the '827 and '653 patents, use compressional spring mechanisms attaching directly to the snare trap, operating in an opposing manner to the present invention, which in one embodiment of the present invention uses an extension return spring pulling rather than pushing the snare away from the animal prey, making the cited references inoperable as the present invention. The '527 patent, as well as the '653 and '827 patents operate with compressional spring mechanisms. Neither does the '624 patent, '527 patent, nor the '837 patent disclose the snare trap releasing function and structure of the present invention.

SUMMARY OF THE INVENTION

The improved foot snare triggering device of the present invention is designed to be used in combination with foot snares.

One embodiment of the present invention, the foot snare triggering device comprises a trigger plate assembly having a pan tension adjustment means which allows the trigger plate assembly to pivotally yield to vertically applied pressure and a base plate of varying diameters depending on the size of the target animal to be captured. The foot snare triggering device further comprises a trigger mechanism having a trigger end engagingly set within the trigger plate assembly and a mechanism end operatively attached to a tandem extension spring configuration, a snare delivery system comprising a plurality of wire springs, and a snare attachment port located within the trigger mechanism for releasably securing a foot snare within the snare delivery system. The device of the present invention may accommodate any number of foot snares known in the industry, attaching to its snare attachment port, for trapping animal prey of varying sizes. The foot snare triggering device triggers the foot snare and allows it to be released from the snare attachment port after being triggered.

Two extension springs (instead of one in other related art) and two pulleys have been incorporated into the improvements. The pulleys are located inside the trigger housing at the mechanism end of the device opposite the base plate. One end of the extension springs are attached to the base plate. On the other ends of the extension springs a steel, or hard/flexible material, cable is attached. The opposing ends of those cables are attached to the trigger assembly stabilizer. By using two cables in conjunction with two pulleys it is now possible to produce the 180 degree bend and direction of tension/compression, with a back and forth movement that is desired to trigger the device. Using this cable-pulley method has greatly reduced the overall length of the extension mechanism.

The trigger plate assembly of an embodiment of the present invention comprises a base plate having a plate underside and defining a pan opening. A pan is pivotally connected by a pan hinge to the plate underside distal to the pan tension adjustment means and the trigger mechanism. The pan has a trigger mount located adjacent to the trigger assembly connection through which the trigger mount engagingly receives the trigger mechanism, said mount having a mount slot to cooperatively receive and engage the trigger mechanism. The pan pivots downward when receiving said applied pressure, thereby engaging the trigger mechanism. The extension mechanism of an embodiment of the present invention causes the snare attachment port to move longitudinally when the trigger mechanism is engaged, or triggered, by applied pressure to the trigger plate assembly.

One embodiment of the present invention also comprises the snare delivery system, attached to the trigger plate assembly, within which the foot snare removably rests, comprising a plurality of wire springs arrayed and extending upward in a manner to secure the foot snare noose, allowing the foot snare to move upward and obliquely toward the extension mechanism when the trigger mechanism is engaged.

In another embodiment, the trigger mechanism and the extension mechanism are enclosed in the trigger housing having a pair of pulleys cooperating with the tandem extension spring configuration to trigger the device, and a housing slot inserted longitudinally along the trigger housing, allowing the snare attachment port and an attached snare attachment means to move with the trigger mechanism within the trigger housing when the device is triggered. To shorten the overall length and height of the device, a combination of two pulleys and extensions springs are incorporated into the extension mechanism.

Another embodiment comprises a snare attachment means adapted to be slidably located on a foot snare and releasably installed in the snare attachment port.

One embodiment of the present invention includes the base plate/pan combination, replacing the solitary pan found on other snaring equipment which enables the present invention to be more easily concealed and stable. The weight activated spring-pan tension device gives greater target selectivity by minimizing the capture of smaller non-target animals. The spring powered horizontal, extension, or "side pull" triggering mechanism makes for a safer mechanism by eliminating the upward firing spring powered throw arm of related art, which may not only injure a person while setting the device, but also may hit a target animal making it shy of future sets if not captured.

Time saving and simplicity in setting are two other advantages of the present invention. The extension mechanism with the adjustable pan tension of the present invention is much safer to use than the known upward or pivoting motion of coil spring (throw arm) devices which may accidentally trigger and cause harm to the person setting the device or hit the animal which could forever educate him to the device. Adjustable pan tension greatly reduces non-target captures.

A principal advantage with the present invention is being able to capture an animal in the animal wrist area, which is more desirable when capturing and relocating prey.

The embodiment of the present invention is durable, easy to set one-piece device, made of a variety of durable materials including metal or high-density plastic. Improvements in the present invention include a shorter device in length by using the tandem extension spring configuration, making the device a more compact, one piece unit with a more efficient snare delivery or moving means. This was accomplished by changing the shape from a basic round design to a square shape. As well, the trigger housing and base plates are now permanently connected, creating a one piece device. The device is now enclosed to help protect the internal moving parts, and strengthen and stabilize the device.

In another embodiment, the trigger housing is rectangular in shape to accommodate the extension mechanism and pulleys.

Another objective is that by manufacture of a trigger mechanism device using non-corrosive materials, embodiments of the present invention will be operable in inclement weather.

An advantage of the present invention is greater reliability and functionality by using a horizontal or longitudinal extension mechanism device combined with wire springs, that rapidly pulls the snare upward and sideways simultaneously, thus capturing the animal.

Another advantage of the present invention is improving animal target specificity by using the adjustable pan tension device keeping the device from firing when a lighter non-target animal steps on the pan. When using this device in conjunction with a foot snare which has breakaway capabilities, non-target captures decrease significantly.

Another advantage is that by using the horizontal and longitudinal operating triggering device, as opposed to the upward firing trigger found on currently snare triggering mechanisms, the animal capture height can be predetermined.

The present invention minimizes setting time by requiring minimal to no dirt excavation. The pan of and embodiment of the present invention requires minimal downward travel to release the trigger, making this one-piece device effective, functional and easy to use.

Using an extension mechanism in an embodiment of the present invention makes it much safer to use than other foot snare devices using an upward release spring which when accidentally fired may cause injury to the user.

In another embodiment, coil, wire springs with extending shafts in a snare delivery mechanism replace a hinged elevation rod, making the device more user friendly and efficient means of snare delivery. Thus, the potential for the prey to step on an elevation rod is eliminated, avoiding a "missed capture". The spring wires have a "360 degree" hinging motion. They do not need to be placed underground and will, therefore, be unaffected by weather changes.

The foregoing and other objectives, advantages, aspects, and features of the present invention will be more fully understood and appreciated by those skilled in the art upon consideration of the detailed description of a preferred embodiment, presented below in conjunction with the accompanying drawings. The aforementioned features, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objectives of the present invention will become apparent in the following detailed descriptions, taken in conjunction with the accompanying drawings. However, the drawings are provided for purposes of illustration only, and are not intended as a definition of the limits of the invention.

DETAILED DESCRIPTION OF THE INVENTION

The present invention will now be described more fully hereinafter with references to the accompanying drawings, in which the preferred embodiment of the invention is shown. This invention may, however, be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
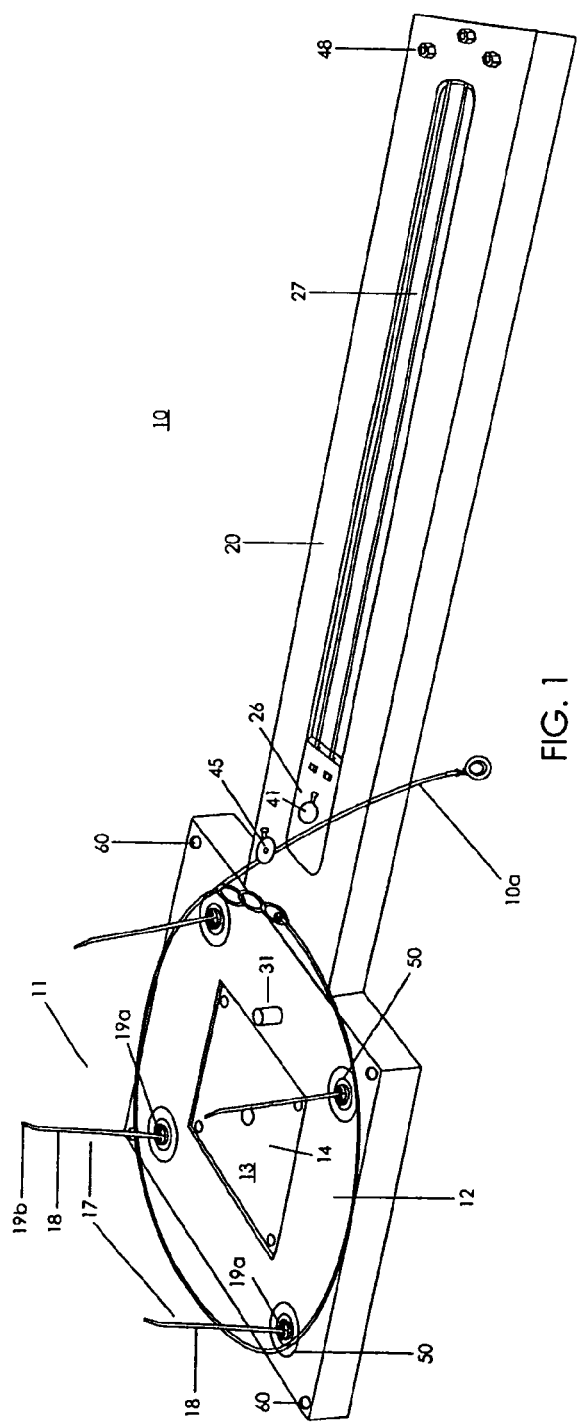
FIG. 1 illustrates a top perspective view of one embodiment of the present invention, depicting it for operation with a foot snare, showing the trigger plate assembly and the trigger housing having the housing slot.
Figure 3:
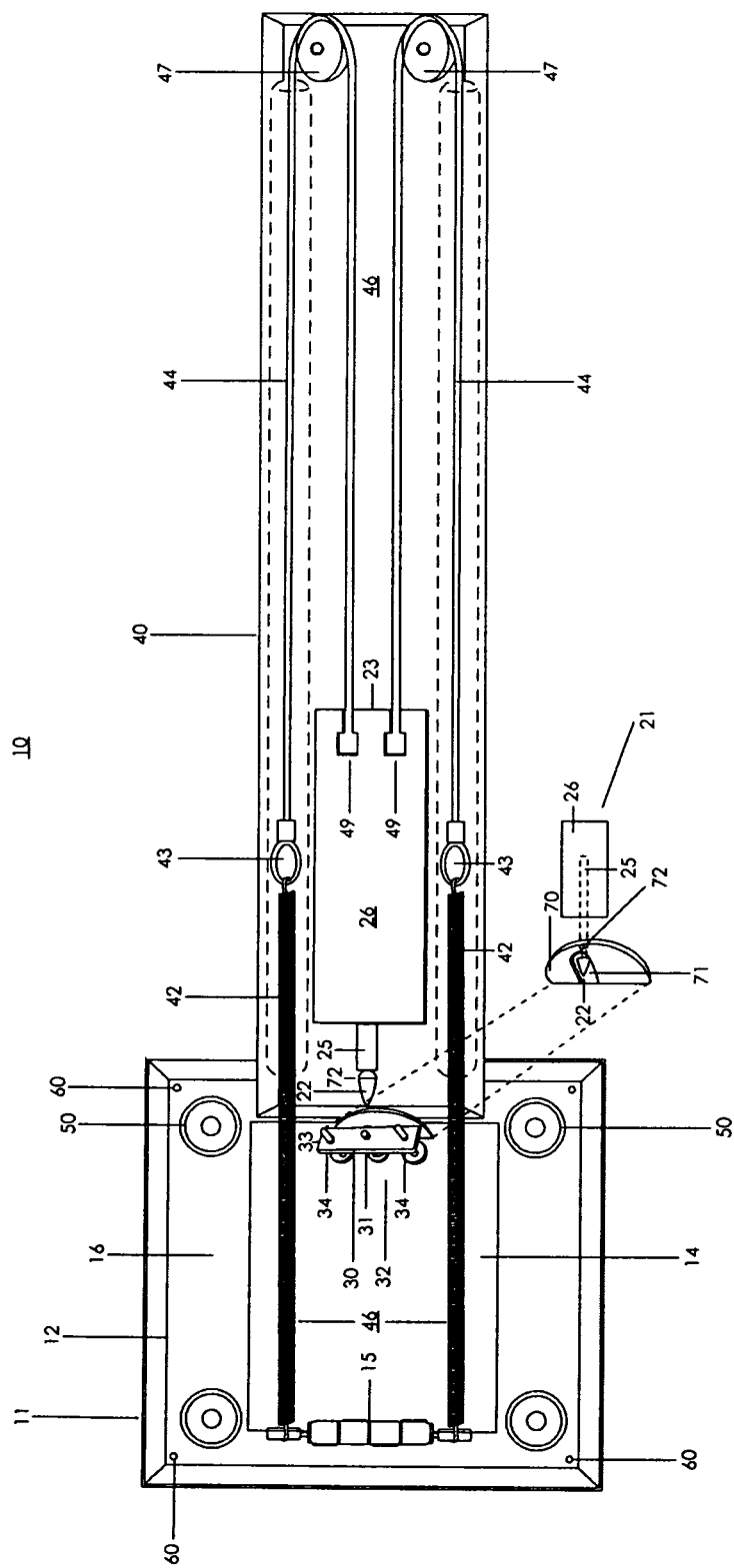
FIG. 3 illustrates a bottom horizontal plane view of one embodiment of the present invention, depicting a plate underside of the base plate and the pan tension adjustment means, including an enlarged view of the trigger mechanism depicting the trigger mount engaging the trigger rod.

Turning now in detail to the drawings in accordance with the present invention. FIG. 1 shows a top perspective view and FIG. 3 shows a bottom horizontal plane view of one embodiment of the foot snare triggering device 10, triggering a foot snare 10a, the device 10 comprising pivotally yielding trigger plate assembly 11 having a pan tension adjustment means 30, the pan tension adjustment means further comprising: a pan tension adjustment bolt 31, passing through a base plate 12 and a pan 14, a pan tension adjustment spring 32 through which said bolt passes, a pan tension adjustment plate 33 connecting to the said bolt 31, and a plurality of pan tension adjustment stabilizers 34 affixed to the pan 14. The pan tension adjustment means 30 allows the trigger plate assembly 11 to pivotally yield to vertically applied pressure of the foot or paw step of an animal, the target of the foot snare 10a, and of varying size and weight, different animals applying differing pressures.

The foot snare triggering device 10 further comprises, as shown in the top perspective view of FIG. 1, a trigger mechanism 21 having a trigger end 22 and an opposite mechanism end 23, the trigger end 22 engagingly set within the trigger plate assembly 11 and the mechanism end 23, operatively and tensionally attached to an extension mechanism 40. The extension mechanism 40 comprises a tandem extension spring configuration 46. As shown in FIG. 3, the trigger mechanism 21 further comprises a trigger assembly stabilizer 26, a trigger rod 25 longitudinally attached to the trigger assembly stabilizer 26 opposite the mechanism end 23, having a trigger catch 72 to engage a mount slot 71 within the trigger plate assembly 11, thereby holding in tension the extension mechanism 40 until the pan 14 is depressed, or pivoted.

Figure 2:
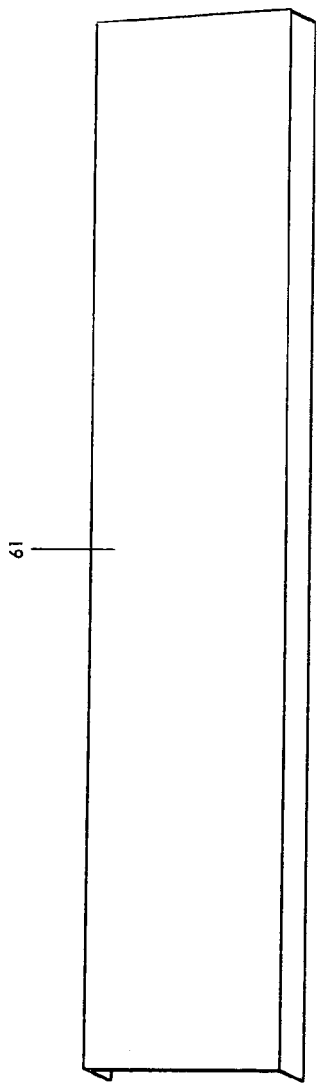
FIG. 2 illustrates a bottom plane, horizontal view of the housing cover to the trigger housing, of an embodiment of the present invention.

As shown in FIG. 3, the tandem extension spring configuration 46 comprises a pair of extension springs 42 longitudinally attached to the base plate 12 at a pan hinge 15 and operatively attached toward the mechanism end 23 to a pair of cable attachment loops 43 and a pair of extension cables 44 cooperatively attached to the pair of cable attachment loops 43 opposite the pair of extension springs 42 and opposedly attached to the trigger assembly stabilizer 26 at a pair of cable attachment ports 49 at the mechanism end 23, and a pair of pulleys 47 attached within a trigger housing at the mechanism end 23 by fastening means 48. The pair of pulleys 47 intermediately engage the pair of extension cables 44 at the mechanism end 23. The tandem extension spring configuration 46 is located entirely within the trigger housing 20, as shown in FIG. 2. The fastening means may be any commonly known fastening means such as bolts, rivets, screws, pins, etc.

As shown in FIG. 1, a snare attachment port 41 is located within the trigger mechanism 21 proximal to the trigger end 22 for releasably securing a foot snare 10*a*. The device of the present invention may accommodate any number or types of foot snares known in the industry, attaching to its snare attachment port 41, for trapping animal prey of varying sizes. The foot snare triggering device 10 of the present invention may be made of any durable, resilient material, such as metal, plastic, or other materials.

The device of an embodiment of the present invention, depicted in FIGS. 1 and 3 (top perspective and bottom plane view of one embodiment) depict the extension mechanism 40 which causes the snare attachment port 41 to move longitudinally when the trigger mechanism 21 is engaged or triggered by applied animal prey pressure to the trigger plate assembly 11. A snare delivery mechanism 17 is attached to the trigger plate assembly 11, within which the foot snare 10*a* removably rests, and comprises: a plurality of wire springs 18 attached and diametrically arrayed in a plurality of elevation spring ports 50 on the base plate 12, each of the plurality of wire springs 18 having an attached end 19*a* and an opposing free end 19*b*. The attached end 19*a* each of said wire springs 18 is connected to the base plate 12 at said spring ports 50 and the opposing free end 19*b* extends vertically above the base plate 12. The foot snare triggering device 10 triggers the foot snare 10*a* and allows it to be released from the extension mechanism 40 at the snare attachment port 41 after being triggered.

The trigger plate assembly 11, of one embodiment shown in FIGS. 1 and 3, comprises a base plate 12 having a plate underside 16 and defining a pan opening 13. A pan 14 is pivotally connected by a pan hinge 15 to the plate underside 16 distal to the pan tension adjustment means 30 (shown in FIG. 3) and the trigger mechanism 21. The pan 14 has a trigger mount 70 through which the trigger mount 70 engagingly receives the trigger mechanism 21, said mount 70 having a mount slot 71 (shown in FIG. 3) to cooperatively receive and engage the trigger mechanism 21.

In the embodiment of the present invention depicted in FIG. 1 (having a partial, plane view of the trigger mechanism 21), the trigger mount 70 is angularly attached to the pan 14 toward the trigger mechanism 21 and may be otherwise described as a downward bending portion of the pan 14, in another embodiment. The pan 14 pivots downward when receiving the applied pressure from the prey thereby engaging the trigger mechanism 21. The base plate 12 can be of varying diameters depending on the size of the target animal to be captured in a foot snare 10*a*. The pan 14 has a slightly larger diameter than the pan opening 13, and is connected by a pan hinge 15 to the plate underside 16 allowing the pan 14 to pivot downwardly when said animal prey pressure, shown in FIG. 1, is applied to the pan 14.

FIG. 3 illustrates a plane bottom view of an embodiment of the present invention, depicting the plate underside 16 of the base plate 12 and the pan tension adjustment means 30, including an enlarged view of a triggering mount 70 for accepting and engaging a trigger rod 25 to the trigger mechanism 21. As further shown in FIG. 3, the pan tension adjustment means 30 comprises a pan tension adjustment bolt 31, passing through the base plate 12 and pan 14, a pan tension adjustment spring 32, to regulate trigger mechanism 21 response to applied pressure 10*b* to the pan 14, through which said bolt 31 passes, a pan tension adjustment plate 33, having threaded features to accept and connect to said bolt 31, and a plurality of pan tension adjustment stabilizers 34, affixed to the pan 14, to hold the pan tension adjustment plate 33 in place. The pan 14 is held upward and in place against the plate underside 16 by the pan tension adjustment means 30. The pan tension adjustment means 30 responds to the vertically applied prey pressure when animal prey steps on the pan 14, and is utilized to gauge the pressure anticipated for engaging or releasing said device 10.

In one embodiment of the present invention the snare delivery mechanism 17 attached to the trigger plate assembly 11 as shown in FIG. 1, within which the foot snare 10*a* removably rests, allows the foot snare 10*a* to move obliquely toward the extension mechanism 40 when the trigger mechanism 21 is engaged.

As shown in FIGS. 1 and 3, in the device of the present invention, the trigger mechanism 21 and the extension mechanism 40 are enclosed in the trigger housing 20 having a housing slot 27 inserted longitudinally along the trigger housing 20, allowing the snare attachment port 41 and an attached snare attachment means 45 attached, fastened or secured to foot snare 10*a* to cooperatively move with the tandem extension spring configuration 46 along the housing slot 27 within the trigger housing 20 toward the mechanism end 23 when the device 10 is triggered causing the trigger assembly stabilizer 26 to move. In another embodiment, the trigger housing 20 may include a housing cover 61, as illustrated in FIG. 2.

The pair of extension springs 42 tensionally engages the trigger mechanism 21 at the trigger end 22 and is anchored to said housing 20 by the pair of pulleys 47. FIG. 3 shows the bottom plane view of the trigger mechanism 21 and the attached extension mechanism 40 disengaged from the trigger plate assembly 11. The pair of extension springs 42, in the extension mechanism 40 of one embodiment, is held in place in the trigger plate assembly 11 at the pan hinge 15 and on its opposite end by the pair of cable attachment loops 43. The trigger rod 25 is attached to the trigger assembly stabilizer 26 at said stabilizer's trigger end 22, shown in FIG. 3.

FIG. 1 shows the top perspective view of the trigger housing 20, in one embodiment, containing the trigger mechanism 21 and extension mechanism 40 of the present invention. The snare attachment port 41 is a hole in the trigger assembly stabilizer 26, which may be initially utilized in an embodiment of the present invention for a setting tool inserted to slide the trigger mechanism 21 forward to engage the trigger rod 25 into the trigger mount 70. This snare attachment port 41 is principally utilized in the present invention to insert the releasable snare attachment means 45, which may be installed as part of a foot snare 10*a*, shown in FIG. 1. As further depicted in FIG. 1, in an embodiment of the present invention, the foot snare triggering device 10 has the snare attachment means 45 that may be slidably located and secured on a foot snare 10*a*. The snare attachment means 45 is releasably installable in the snare attachment port 41 through the housing slot 27 and thereby connectable to the foot snare triggering device 10, adapting the foot snares 10*a*, commonly known in the industry, to be adaptable to be used in combination with the foot snare triggering device 10. The snare attachment means 45 may be an eye bolt, or a clip, bolt, catch or other fastener, connectable and installable, and detachable or releasable, from the snare attachment port 41, to temporarily and slidably secure a foot snare 10*a*, when the foot snare 10*a* is set, then triggered, by the foot snare triggering device 10.

The trigger mechanism 21 is pushed or pulled in place, and the trigger rod 25 (having a pointed or cooperating trigger end 22 in one embodiment) engages into the mount slot 71 which is located on a downward bend in the pan 14. The pan tension adjustment spring 32, below the pan 14 as shown in FIG. 3, provides pressure to the trigger mount slot 71 for holding the trigger rod 25, and setting, arming or triggering said device 10. When the trigger mechanism 21 fires longitudinally backward, or away from the trigger plate assembly 11, with release of the extension mechanism 40, tightening the foot snare 10*a* around the animal's foot by operation of the foot snare triggering device 10, cinching the foot snare 10*a*, said snare 10*a*, by the snare attachment means 45, may be extracted and released from the snare attachment port 41 in the trigger assembly stabilizer 26, rendering the foot snare 10*a* independent from the foot snare triggering device 10. The housing slot 27 enables access to the extension mechanism 40 to set said device 10.

In FIG. 1, an attachment bolt or other snare attachment means 45, as noted above, may be connected to the foot snare 10*a* as a means to attach the snare 10*a* to the trigger mechanism 21 at its snare attachment port 41 in the trigger assembly stabilizer 26, through the housing slot 27. The snare 10*a* is then placed on the base plate 12 around the pan 14, as shown in FIG. 1. The loose end of the snare 10*a* generally, is connected to an anchoring device or staked out, in its common usage in the industry. The base plate 12 can be anchored in place by spikes via the stake holes 60. When an animal of desired weight steps on the pan 14, the pan 14 drops or pivots slightly releasing the trigger rod 25 from the trigger mount 70, shown in FIG. 3. When the trigger mechanism 21 slides or is pulled back by the extension mechanism 40 it pulls or cinches the snare 10*a* simultaneously upward and sideways, by operation of the snare delivery mechanism 17, capturing the animal at the desired height on the leg. With upward movement by the caught prey, the cinched foot snare 10a may then disengage from the trigger mechanism 21 when the foot snare 10*a*(by the snare attachment means 45) slides or pulls out of the snare attachment port 41 in the trigger assembly stabilizer 26, a noted above, by any animal resistance.

Improvements in the present inventions include a shorter device 10 in length by using the tandem extension spring configuration 46, making the device 10 a more compact, one piece unit with a more efficient snare delivery mechanism 17 or snare 10*a* noose moving means. This was accomplished by changing the shape of the trigger plate assembly 11 from a basic round design to a square shape cooperating with the array of the wire springs 18 and connection to the extension mechanism 40. As well, the trigger housing 20 and base plate 12 are now permanently connected, creating a one piece device 10. The device 10 is now enclosed to help protect the internal moving parts, and strengthen an stabilize the device.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention and device, therefore, should not be restricted, except in the following claims and their equivalents.

I claim:

1. A foot snare triggering device said device comprising:
   (a) a trigger plate assembly having a pan tension adjustment means for allowing the trigger plate assembly to pivotally yield to vertically applied pressure, the pan tension adjustment means comprising: a pan tension adjustment bolt, passing through a base plate and a pan, a pan tension adjustment spring through which said bolt passes, a pan tension adjustment plate connecting to the said bolt, and a plurality of pan tension adjustment stabilizers affixed to the pan;
   (b) a trigger mechanism having a trigger end and an opposite mechanism end, the trigger end engagingly set within the trigger plate assembly and the mechanism end operatively and tensionally attached to an extension mechanism comprising: a tandem extension spring configuration;
   (c) the trigger mechanism further comprising: a trigger assembly stabilizer, a trigger rod longitudinally attached to the trigger assembly stabilizer opposite the mechanism end, the trigger rod having a trigger catch to engage a mount slot within the trigger plate assembly;
   (d) a snare attachment port located within the trigger mechanism proximal to the trigger end for releasably securing a foot snare;
   (e) the tandem extension spring configuration comprising: at least a pair of extension springs longitudinally attached to the base plate at a pan hinge and operatively attached toward the mechanism end to a pair of cable attachment loops, a pair of extension cables cooperatively attached to the pair of cable attachment loops opposite the pair of extension springs and opposedly attached to the trigger assembly stabilizer at a pair of cable attachment ports at the mechanism end, the tandem extension spring configuration being located within a trigger housing, and a pair of pulleys attached within the trigger housing at the mechanism end by a fastening means and intermediately engaging the pair of extension cables at the mechanism end;
   (f) wherein the trigger mechanism and the extension mechanism are enclosed in the trigger housing comprising: a housing cover protectively enclosing said device and a housing slot inserted longitudinally along the trigger housing allowing the snare attachment port and a snare attachment means attached to the snare attachment port to cooperatively move with the tandem extension spring configuration along the housing slot toward the pair of pulleys when said device is triggered, the extension mechanism causing the snare attachment port to move longitudinally when the trigger mechanism is triggered by applied pressure to the trigger plate assembly;
   (g) a snare delivery mechanism attached to the trigger plate assembly, within which the foot snare removably rests, comprising: a plurality of wire springs attached and diametrically arrayed in a plurality of elevation spring ports on the base plate, the plurality of wire springs having an attached base end and an opposing free end, the attached base end connected to the base plate at said spring ports and the opposing free end extending vertically above the base plate, said foot snare resting outside said diametric array; and (h) whereby said triggering device triggers the foot snare and allows the foot snare to be released from the snare attachment port after being triggered.

2. The device of claim 1, wherein the trigger plate assembly further comprises:

(a) the base plate having a plate underside and defining a pan opening;

(b) the pan pivotally connected by the pan hinge to the plate underside distal to the pan tension adjustment means and the trigger mechanism;

(c) the pan having a trigger mount through which the trigger mount engagingly receives the trigger mechanism, said mount having the mount slot to cooperatively receive and engage the trigger mechanism; and (d) the pan pivoting downward when receiving said applied pressure engaging the trigger mechanism.

3. The device of claim 1, further comprising:

(a) the snare attachment means releasably installable in the snare attachment port for attaching the foot snare through the housing slot;

(b) the snare attachment means slidably located on the foot snare; and (c) whereby the foot snare is further adapted to be used in combination with the foot snare triggering device.

4. The device of claim 1 comprising:

(a) the trigger plate assembly having a cooperative square shape; and (b) and the trigger housing in permanent connection to the base plate.

5. The device according to claim 2, wherein the trigger mount of the pan is angularly attached to the pan towards the trigger mechanism.

\* \* \* \* \*